United States Patent
Kwack et al.

[11] Patent Number: 6,157,879
[45] Date of Patent: Dec. 5, 2000

[54] METHOD FOR CONTROLLING SUSPENSION APPARATUS FOR VEHICLE

[75] Inventors: Byung-Hack Kwack; Jung-Soo Sim, both of Sungnam, Rep. of Korea

[73] Assignee: Mando Corporation, Kyongki-Do, Rep. of Korea

[21] Appl. No.: 08/924,184

[22] Filed: Sep. 5, 1997

[30] Foreign Application Priority Data

Apr. 3, 1997 [KR] Rep. of Korea ............... 97-12417

[51] Int. Cl.[7] .................... B60G 17/00; B60G 23/00
[52] U.S. Cl. .................................... 701/37; 280/5.5
[58] Field of Search .................. 701/37, 38; 280/5.5, 280/5.507, 5.504, 5.515, 5.519

[56] References Cited

U.S. PATENT DOCUMENTS

| | | | |
|---|---|---|---|
| 4,685,698 | 8/1987 | Klinkner et al. | 280/707 |
| 4,717,173 | 1/1988 | Sugasawa et al. | 280/707 |
| 4,809,179 | 2/1989 | Klinger et al. | 364/424.05 |
| 4,903,982 | 2/1990 | Harara et al. | 280/707 |
| 4,970,645 | 11/1990 | Adachi et al. | 364/424.05 |
| 5,200,895 | 4/1993 | Emura et al. | 701/37 |
| 5,235,529 | 8/1993 | Hanson et al. | 701/37 |
| 5,295,705 | 3/1994 | Butsuen et al. | 188/266.4 |
| 5,347,457 | 9/1994 | Tanaka et al. | 364/424.05 |
| 5,365,432 | 11/1994 | Kakizaki et al. | 364/424.05 |
| 5,450,322 | 9/1995 | Tanaka et al. | 364/424.05 |
| 5,490,068 | 2/1996 | Shimizu et al. | 364/424.05 |
| 5,521,821 | 5/1996 | Shimizu et al. | 364/424.05 |
| 5,570,289 | 10/1996 | Stacey et al. | 364/424.05 |
| 5,802,486 | 9/1998 | Uchiyama | 701/37 |
| 5,828,970 | 10/1998 | Kimura et al. | 701/37 |
| 5,911,768 | 6/1999 | Sasaki | 701/38 |

*Primary Examiner*—Michael J. Zanelli
*Attorney, Agent, or Firm*—Lawrence G. Kurland; Bryan Cave LLP

[57] ABSTRACT

An improved method for controlling a suspension apparatus for a vehicle which is capable of enhancing a boarding-on feeling and a running stability by increasing a boarding-on feeling and the road surface contact force of wheels based on the size of a road surface input and a control logic which is variable in accordance with a frequency. The method includes the steps of obtaining a displacement value by passing an acceleration value measured by a vehicle vertical acceleration sensor through an integration unit having the following Equation (1); and computing a predetermined road surface signal by using the acceleration and displacement value as shown in Equation (2);

$$\frac{v(s)}{a(s)} = \frac{S}{S^2 + 2\xi_1 \omega_1 S + \omega_1^2} \quad (1)$$

where, $\xi_1$ and $w_1$ are coefficients used for determining the coefficient of the filter used in the integration.

$$r(t) = d_s(t) + c \times a_s(t) \quad (2)$$

8 Claims, 4 Drawing Sheets

METHOD FOR CONTROLLING SUSPENSION APPARATUS FOR VEHICLE

This application is based on application No. 97-12417 filed in Republic of Korea, the content of which is incorporated hereinto by reference.

BACKGROUND OF THE INVENTION

1. Field of the Invention

The present invention relates to a method for controlling a suspension apparatus for a vehicle, and in particular, to an improved method for controlling a suspension apparatus for a vehicle which is capable of significantly enhancing a boarding-on feeling and a driving stability by accurately detecting a road surface condition by using a vehicle sensor.

2. Description of the Conventional Art

As shown in FIG. 1, the conventional electronical control suspension apparatus (ECS) for a vehicle includes a sensor unit for measuring a driving and operational state of a vehicle, an ECU (Central Processing Unit) for computing an operational state using a measured signal, a damper for generating a damping force for controlling the operation of a vehicle, and an electronical type actuator for rotating a control rod of the damper.

In addition, the sensor unit includes a vertical accelerating sensor for detecting an upper and lower direction acceleration, a vehicle speed sensor 2 for computing the speed of a vehicle, a brake on/off sensor 3 for detecting the braking operation, a TPS 4 for detecting a throttle angle of an engine, and a steering sensor 5 for measuring a steering angular speed.

The ECU determines a damping force of the damper based on the signal sensed by the sensor and switches the position of the electronical type actuator 6 disposed above four wheel dampers.

The damper is formed with a multiple type variable damper and an electronical type actuator. The damping force generated by the multiple type variable damper drives the electronical type actuator 6 disposed above the damper and rotates the control rod of the damper, thus varying the side of a flow path and adjusting the damping force of four wheel dampers to a corresponding damping force position.

In the drawings, reference numeral 7 denotes an ECU for electronically controlling elements of the apparatus.

In addition, the conventional ECS system is formed with six logic based on a control state of each element.

First, an anti-bounce control is directed to detecting an operational state of a bumper or the condition of an uneven road. The control is returned to an original state after t1 seconds when the control state is switched to a medium state in a state that the speed of the vehicle is above V1 Kph by detecting the operation state of a bumper or a road condition, and the size of the vertical acceleration of the vehicle positioned at the weight center (console box) of the vehicle is above G1 g.

Second, in an anti-shake control, the control state of the vehicle is switched to a hard state when the speed of the vehicle is below V2 Kph in order to reduce the motion of the vehicle when a passenger gets on or gets off the vehicle when the vehicle is stopping or a predetermined load is loaded onto or unloaded from the vehicle, and is switched to an original state when the speed of the vehicle is maintained at above V21 Kph for t2 seconds.

In the state of a quick sensing operation, namely, when the vehicle runs at a high speed, in order to obtain a driving stability of the vehicle, when the speed of the vehicle is maintained at above V3 Kph for more than t2 seconds, the control state is switched to the medium control state, and when the speed of the vehicle is below V31 Kph, the control state is returned to the original control state.

Third, an anti-squat control is switched to the medium control state when the speed of the vehicle is below V4 Kph and the angle is above θ4 degrees of the throttle in order for the front portion of the vehicle to be moved in the upper and lower directions when the vehicle is moved at a low speed.

Fourth, an anti-dive control is switched to a hard mode when a braking switch is turned on by the braking operation when the speed of the vehicle is above V5 Kph in order for the front portion of the vehicle to be minimized in the downward direction when braking the vehicle at intermediate and high speeds.

Fifth, an anti-roll control is switched to a hard control state when the steering angular speeds are more than θ61 Deg/sec, θ62 Deg/sec, θ63 Deg/sec, θ64 Deg/sec, respectively, at the time when the speed of the vehicle is V61 Kph, V62 Kph, V63 Kph, V64 Kph, when the speed of the vehicle is above V6 Kph in order to secure the stability of the vehicle when steering the same, and the anti-roll control state is returned to an original state when t6 seconds after the above-described conditions are released.

However, since the above-described conventional ECS system is controlled based on a table made by an input condition of a driver without using the frequency of a road surface and the roughness of the same on which a vehicle runs, it is impossible to obtain a desired boarding-on feeling of a vehicle. Therefore, it is impossible to enhance the boarding-on feeling which is an object of the electronical control suspension apparatus for a vehicle.

In addition, since there are many control factors based on the stability of a vehicle, it is impossible to satisfy all the control factors when they are needed.

SUMMARY OF THE INVENTION

Accordingly, it is an object of the present invention to provide a method for controlling a suspension apparatus for a vehicle which overcomes the aforementioned problems encountered in the conventional art.

It is another object of the present invention to provide an improved method for controlling a suspension apparatus for a vehicle which is capable of enhancing a boarding-on feeling and a running stability by increasing a boarding-on feeling and the road surface contact force of wheels based on the size of a road surface input and a control logic which is variable in accordance with a frequency.

To achieve the above objects, there is provided a method for controlling a suspension apparatus for a vehicle which includes the steps of obtaining a displacement value by passing an acceleration value measured by a vehicle vertical acceleration sensor through an integration unit having the following Equation (1); and computing a predetermined road surface signal by using the acceleration and displacement value as shown in Equation (2);

$$\frac{v(s)}{a(s)} = \frac{S}{S^2 + 2\xi_1 \omega_1 S + \omega_1^2} \tag{1}$$

where, $\xi_1$ and $w_1$ are coefficients used for determining the coefficient of the filter used in the integration.

$$r(t) = d_s(t) + c \times a_s(t) \tag{2}$$

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
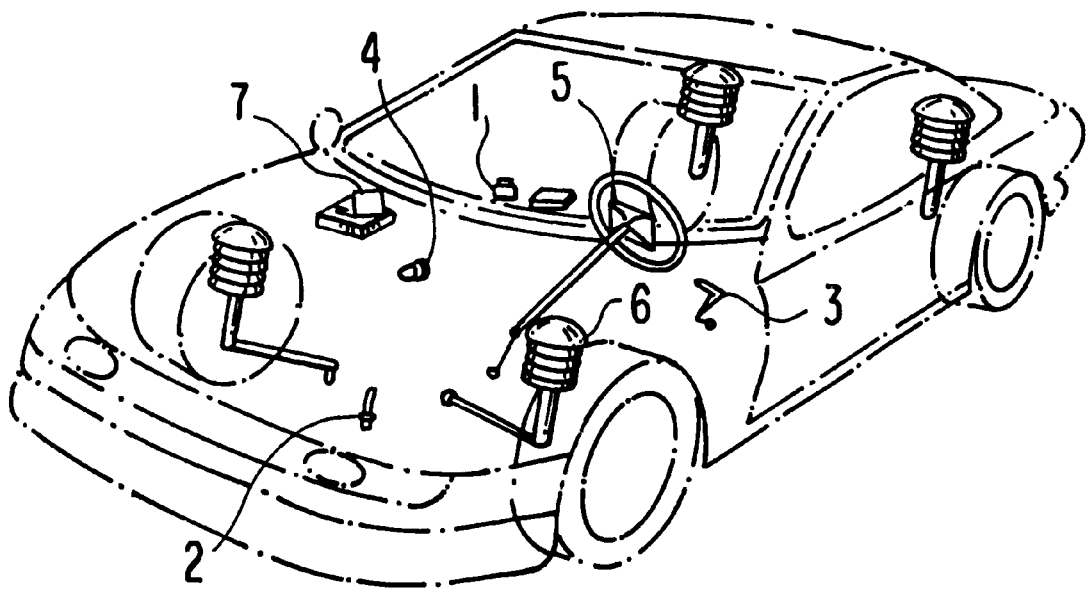
FIG. 1 is a perspective view illustrating the construction of a conventional ECS for a vehicle.
Figure 2:
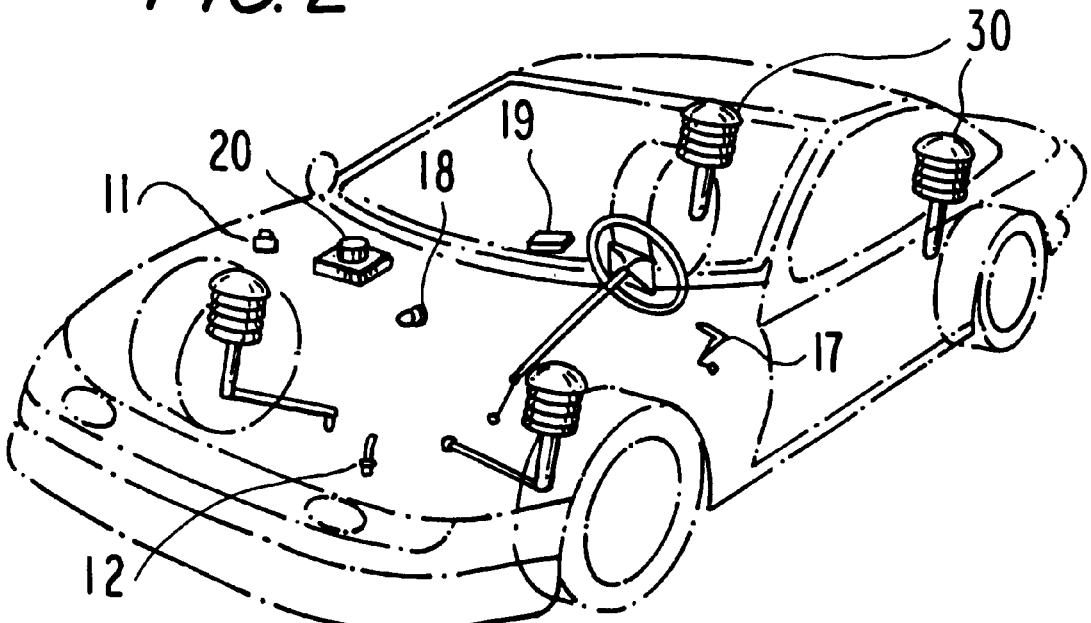
FIG. 2 is a perspective view illustrating a road surface detection type electronical control suspension apparatus for a vehicle according to the present invention.

As shown in FIG. 2, the electronical control suspension apparatus using a road surface detection method according to the present invention includes a front wheel vertical acceleration sensor 11 for detecting an acceleration in a vertical direction with respect to a vehicle, an ECU 20 for computing a control logic based on a measured signal and controlling an actuator in accordance with a result of the computation, and a damper and actuator 30 for generating a damping force for controlling the operation of a vehicle. In the drawings, reference numeral 17 denotes a brake on/off sensor, 18 denotes a throttle position sensor (TPS), and 19 denotes a mode selection switch.

Figure 3:
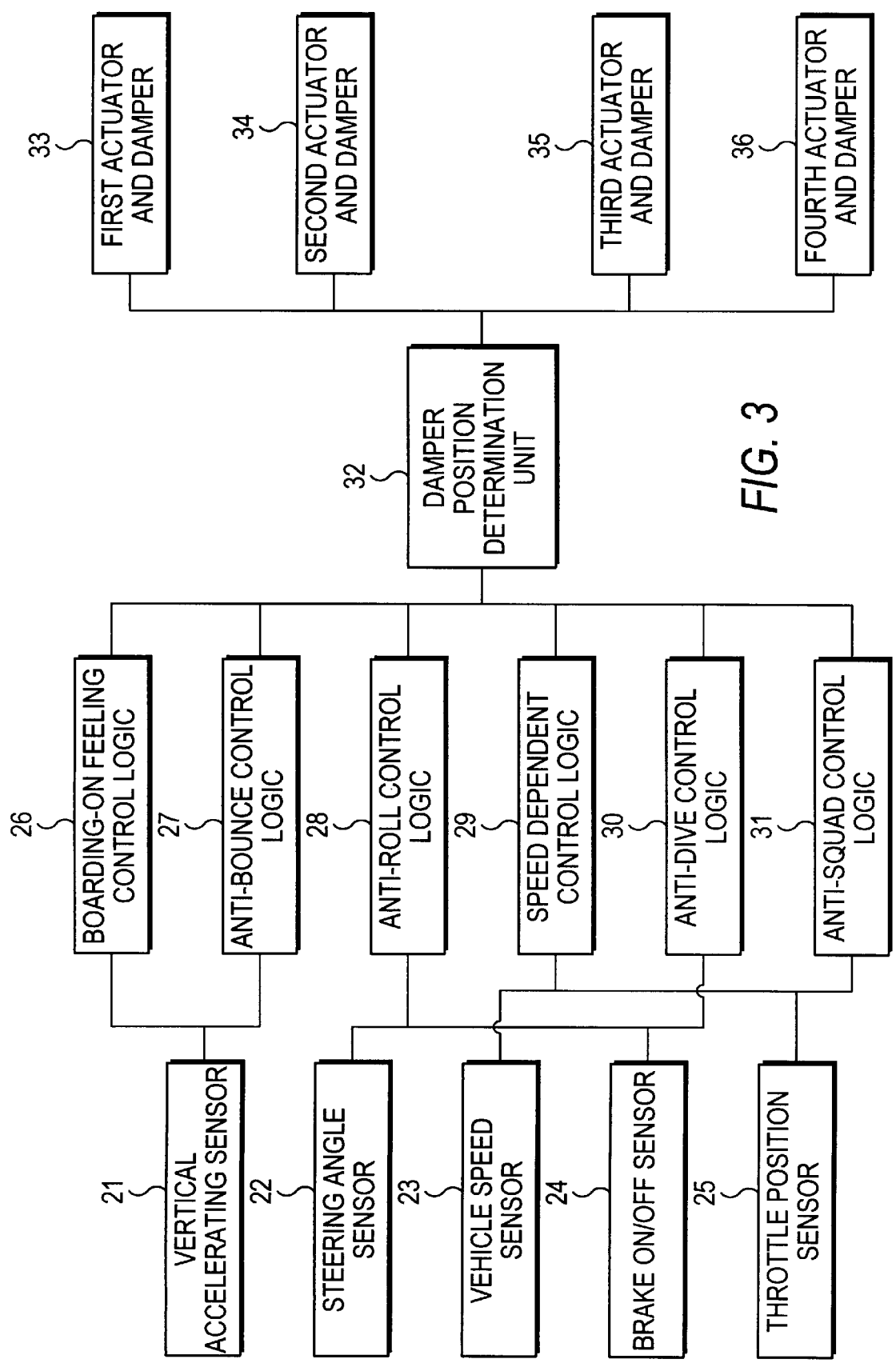
FIG. 3 is a block diagram illustrating a method for controlling a suspension apparatus for a vehicle according to the present invention.

As shown in FIG. 3, there are provided a vertical acceleration sensor 21 disposed in an input side, a steering angle sensor 22, a vehicle speed sensor 23, a brake on/off sensor 24, and a throttle position sensor 25.

In addition, there are further provided a boarding-on feeling control logic 26 for receiving a data from each of the sensors and performing the logic operation, an anti-bounce control logic, an anti-roll control logic 28, a speed dependent control logic 29, an anti-dive control logic 30, and an anti-squad logic 31.

In an output side, there are provided a damper position determination unit 32 for controlling the position based on each logic and first through fourth actuators and damper 33 through 36 disposed in the output terminal of the system.

Figure 4:
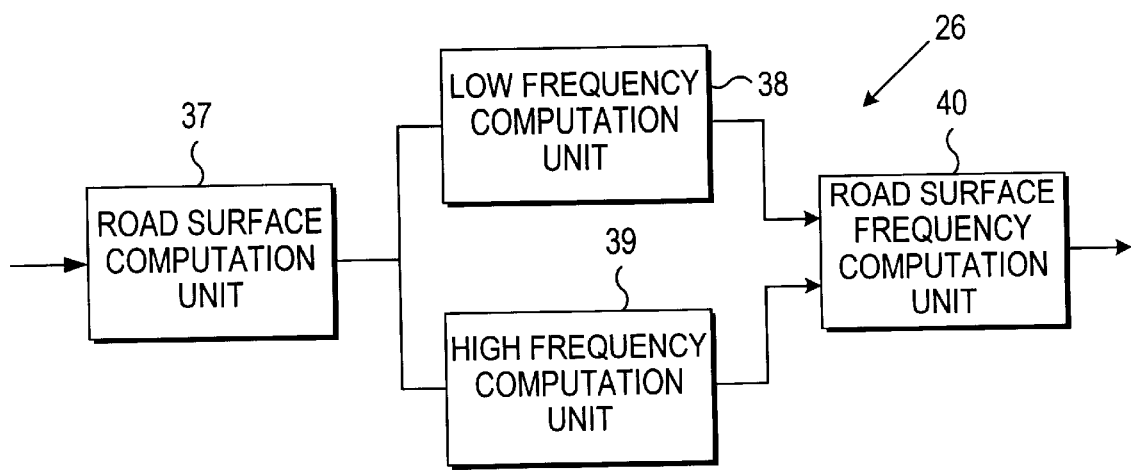
FIG. 4 is a block diagram illustrating a boarding-on feeling control logic according to the present invention.

As shown in FIG. 4, there are provided a road surface computation unit 37 for computing a road surface based in the data from the vertical acceleration sensor 21, a low frequency computation unit 38 and a high frequency computation unit 39 for computing the low frequency and high frequency in accordance with the output from the road surface computation unit 37, and a road surface frequency unit 40 for computing a road surface frequency based on the outputs from the low frequency computation unit 38 and the high frequency computation unit 39.

Figure 5:
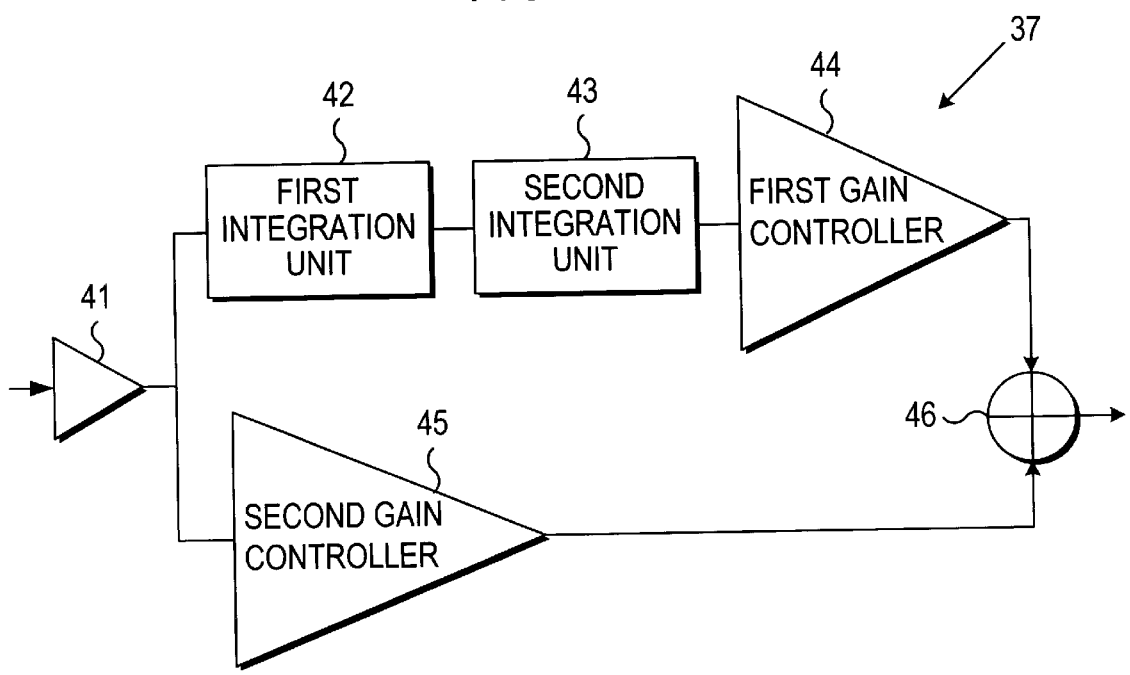
FIG. 5 is a block diagram illustrating a road surface computation unit according to the present invention.

As shown in FIG. 5, the road surface unit 37 includes an acceleration unit 41, a first integration unit 42 for integrating the output from the acceleration unit 41, a second integration unit 43 for integrating the output from the first integration unit 42, a first gain controller 44 for controlling the gain based in the output from the second integration unit 43, a second gain controller 45 for controlling the gain of the acceleration unit 41, and an adder 46 for adding the outputs from the first and second gain controllers 44 and 45.

Figure 6:
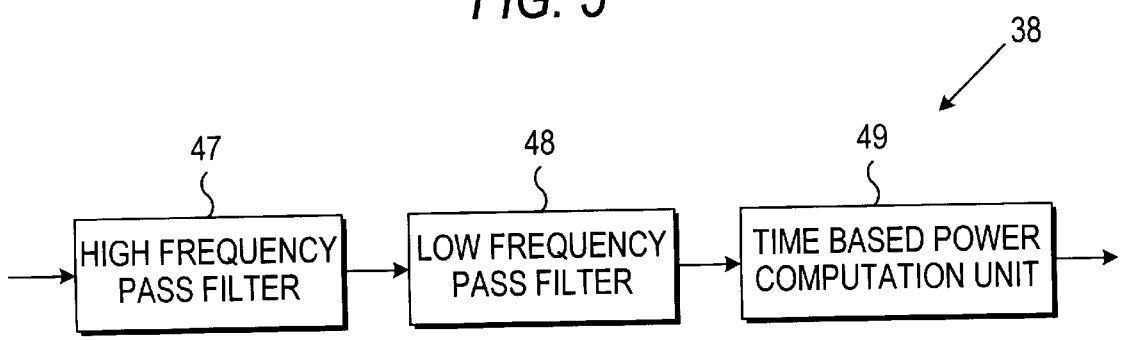
FIG. 6 is a block diagram illustrating a low frequency computation unit according to the present invention.

As shown in FIG. 6, the low frequency computation unit 38 includes a high frequency pass filter 47, a low frequency pass filter 48, and a time based power computation unit 49.

Figure 7:
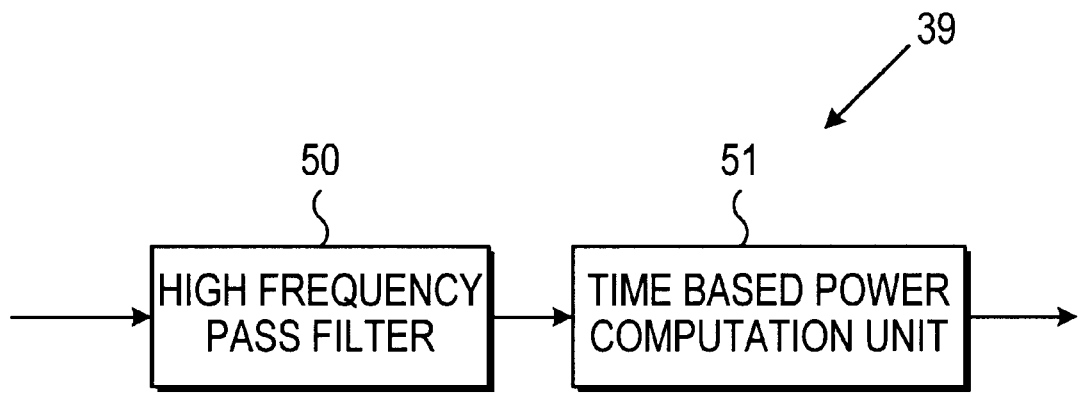
FIG. 7 is a block diagram illustrating a high frequency computation unit according to the present invention.

As shown in FIG. 7, the high frequency computation unit 39 includes a high frequency pass filter 50, and a time based power computation unit 51.

Figure 8:
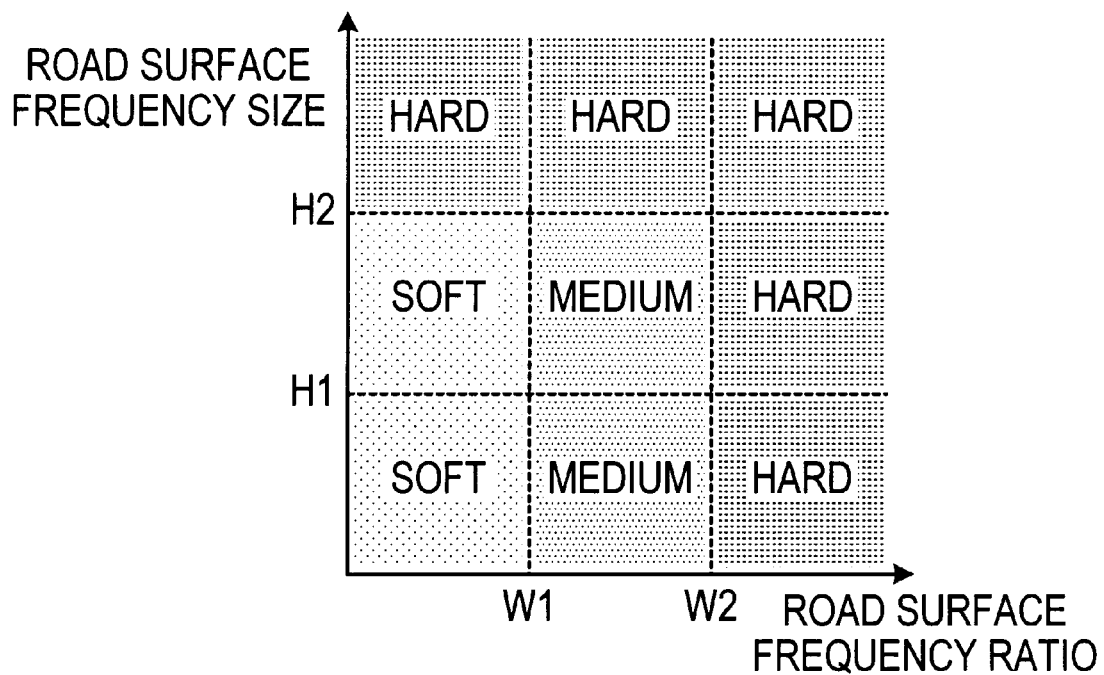
FIG. 8 is a diagram illustrating a damper control map according to the present invention.

FIG. 8 illustrates a damper control map in which a ratio between the road surface frequency ratio and the road surface high frequency ratio is shown.

In the thusly constituted suspension apparatus for a vehicle according to the present invention, the road surface computation unit 37 of the boarding-on control logic 26 which receives the data detected by the vertical acceleration sensor 21 computes a predetermined road surface, and the low frequency computation unit 38 computes the size of the low frequency component based on the thusly computed road surface, and the high frequency computation unit 39 computes the size of the high frequency components.

Therefore, the size of the low and high frequency components is computed based on the thusly computed road surface, and then the road surface frequency computation unit 40 computes the road surface frequency ratio based on a size ratio between the low frequency component size and the high frequency component size.

The thusly computed road surface frequency becomes a variable for controlling the operation state of the damper based on the frequency and size of the road surface input.

In addition, as shown in FIG. 5, in the road surface computation unit 37, a predetermined road surface is computed by the vertical acceleration sensor 21, the output signal from the vertical acceleration sensor 21 becomes a vertical displacement value by the first and second integration units 42 and 43, and then a predetermined road surface is computed by multiplying the thusly computed displacement value with a coefficient by the following Equation (1).

$$r(t)=d_s(t)+c \times a_s(t) \tag{1}$$

Here, the first and second integration units 42 and 43 remove a DC-offset from the vertical acceleration and computes a vertical speed and vertical displacement value in a frequency region which a designer wishes to use. Therefore, the following filter Equation (2) of the integration units is given as follows:

$$\frac{v(s)}{a(s)} = \frac{S}{S^2 + 2\xi_1 \omega_1 S + \omega_1^2} \tag{2}$$

where, $\xi_1$ and $w_1$ are coefficients used for determining the coefficient of the filter used in the integration.

In addition, the low frequency computation unit 38 computes a time based power value of a low frequency component tocorresponding to a resonant frequency based on a predetermined road surface computed by a predetermined road surface computation unit, and computes only a signal which corresponds to a resonant region by passing the signal, which is passed through the high frequency pass filter 47, though the low frequency pass filter 48, thus computing a time based power based on the thusly computed signal.

Namely, the high frequency pass filter 47 passes all the signals the levels of which are above the resonant region, and removes the signals the levels of which are below the frequency set by the filter, and the low pass filter 48 passes through the signals the levels of which are below the set frequency and removes the signals the levels of which are above the set frequency. Therefore, the operation of the limited pass filter is performed together with the high frequency pass filter.

The following Equations (3) and (4) are related to the filter Equations of the high frequency pass filter 47 and the low frequency pass filter 48. The time based power computation unit 49 computes the time based power value based on the resonant region signal obtained by Equations (3) and (4).

$$\frac{r_{l1}(s)}{r(s)} = \frac{S^2}{S^2 + 2\xi_2\omega_2 S + \omega_2^2} \quad (3)$$

$$\frac{r_{l2}(s)}{r_{l1}(s)} = \frac{\omega^2}{S^2 + 2\xi_3\omega_3 S + \omega_3^2} \quad (4)$$

In the following Equation (5), only the absolute value of the output signal from the previous circuit is obtained and then filtered.

$$\frac{r_{l(s)}}{|r_{l2(s)}|} = \frac{1}{TS} \quad (5)$$

In addition, the high frequency computation unit 39 includes the high frequency pass filter 50 and the time based power computation unit 51. Therefore, the high frequency computation unit 39 computes a time based power value of a high frequency component corresponding to the resonant frequency based on a predetermined road surface in Equation (1), and the high frequency computation unit 39 computes a time based power from the signal passed through the high frequency pass filter 50 for thus computing a high frequency power corresponding to the resonant region.

This filter passes through only the vehicle resonant region signal, and the vehicle resonant region signal which is a frequency signal is removed. The following Equation (6) is a high frequency pass filter equation.

$$\frac{r_{hl}(s)}{r(s)} = \frac{S^2}{S^2 + 2\xi_4\omega_4 S + \omega_4^2} \quad (6)$$

where, the interrelationship of the time based power computation unit 51 is as follows:

$$\frac{r_h(s)}{|r_{hl(s)}|} = \frac{1}{TS+1} \quad (7)$$

In addition, the road surface computation unit 40 computes a time based power value of a high frequency component corresponding to a vehicle resonant frequency based on a predetermined road surface computed in Equation (1).

The road surface frequency computation unit 40 divides the low frequency level computed in Equation (5) into high frequency levels, thus computing a road surface frequency ratio.

The following Equation (8) is obtained thereby.

$$wc(t) = \frac{r_{l(t)}}{r_{h(t)}} \quad (8)$$

In addition, the damper position determination unit 32 computes a current proper damper position based on the road surface frequency ratio obtained by the boarding-on feeling control logic and the road surface high frequency level, and a two-dimensional map is implemented based on the road surface frequency ratio and the road surface high frequency level, and the position of the damper based on the road surface frequency and the road surface high frequency may be expressed as shown in FIG. 8.

If $r(t) \geq H2$, the damper position: hard

In addition, 1) $w2 \leq w^*(t) \rightarrow$ damper position: hard
2) $w1 \leq w^*(t) \leq w2 \rightarrow$ damper position: medium
3) $w1 \leq w^*(t) \rightarrow$ damper position : soft Namely, if the high frequency representive value is increased, or if the frequency ratio of the road surface is increased, the damping force of the damper is increased, thus stably controlling the apparatus and enhancing the boarding-on feeling of the vehicle.

As described above, in the suspension control apparatus for a vehicle according to the present invention, there is provide a control logic which is capable of selecting an optimum damping a force curve for controlling a boarding-on feeling of a vehicle and enhancing a stability of the same based on a vertical acceleration sensor disposed in an upper portion of the damper, so that it is possible to detect a vehicle resonant region based on a road surface frequency ratio when a vehicle runs on a road surface on which a vehicle resonant occurs, thus minimizing a vehicle vibration. Furthermore, it is possible to detect whether the vehicle runs on a road surface on which a vehicle resonant occurs and increase a damping force for thus enhancing a driving stability and a boarding-on feeling.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A method for controlling a boarding-on feeling in a suspension apparatus for a vehicle comprising the steps of:

obtaining a displacement value d(S) by integrating an acceleration value measured by a vehicle vertical acceleration sensor through a plurality of integration units having the following Equation (1):

$$d(S) = \frac{v(s)}{a(s)} = \frac{S}{S^2 + 2\xi_1\omega_1 S + \omega_1^2} \quad (1)$$

where, v(S) is a vertical velocity value, a(S) is a vertical acceleration value, S is a Laplace changer, $\epsilon_1$ is a coefficient of attenuation, and $\omega_1$ is a passing frequency of low pass filter; and computing a road surface signal by using the acceleration and displacement value as shown in the following Equation (2) wherein the results of said following Equation (2) are used to control said boarding-on feeling in a suspension apparatus in a vehicle;

$$r(t) = d_s(t) + c \times a_s(t) \quad (2)$$

where, r(t) is a road surface computation value in time domain, ds(t) is a vertical displacement value, c is a coefficient, and as(t) is a vertical acceleration value.

2. The method of claim 1, further comprising the steps of: computing a signal corresponding to a vehicle resonant region by passing the road surface signal through high and low pass filters based on the following Equations (3) and (4):

$$\frac{r_\eta(S)}{r(S)} = \frac{S^2}{S^2 + 2\varepsilon_2 \omega_2 S + \omega_2^2} \quad (3)$$

where, $r_\eta(S)$ is a low frequency value of a road surface and r(S) is a road surface computation value in frequency domain, $$\frac{r_{l2}(S)}{r\eta(S)} = \frac{\omega^2}{\omega^2 + S^2 + 2\varepsilon_3 \omega_3 S + \omega_3^2} \quad (4)$$

where r12(S) is a high frequency value of a road surface; and computing a representative value corresponding to a low frequency of a road surface by passing the signal representative of vehicle resonance and an absolute value obtained in the following Equation (5) through a low frequency pass filter:

$$\frac{r_{1(S)}}{|r_{12(S)}|} = \frac{1}{TS} \quad (5)$$

where, $r_{1(s)}$ is a power computation result value of a vehicle resonant region and TS is a time constant.

3. The method of claim 2, further comprising the steps of: computing a signal corresponding to a vehicle resonant region by passing the road surface signal through a high frequency pass filter as shown in the following Equation (6):

$$\frac{r_{h1}(S)}{r(S)} = \frac{S^2}{S^2 + 2\varepsilon_4 \omega_4 S + \omega_4^2} \quad (6)$$

where, $r_{h1}(S)$ is a passing signal of the high frequency filter and r(S) is a road surface computation value in frequency domain; and computing a representative value corresponding to a high frequency of a road service by passing the signal representative of vehicle resonance and an absolute value obeyed in the following Equation (7) through a low frequency pass filter:

$$\frac{r_h(S)}{|r_{h1}(S)|} = \frac{1}{TS+1} \quad (7)$$

where $r_h(S)$ is a power computation resultant value of a vehicle resonant region.

4. The method of claim 3, further comprising the steps of: obtaining a ratio by dividing the computed high frequency representative value and the computed low frequency representative value of a road surface as shown in the following Equation (8):

$$\omega c(t) = \frac{r_{1(t)}}{r_{h(t)}} \quad (8)$$

where $\omega c(t)$ is a frequency ratio of a road surface, $r_1(t)$ is low frequency value of a road surface in time domain and $r_n(t)$ is a computation resultant value of a vehicle resonant region in time domain; and computing a difference of the frequencies of a road surface on which a vehicle runs.

5. The method of claim 4, further comprising the steps of:

forming a two-dimensional map based on two control variables with respect to a high frequency representative value of a road surface and a frequency ratio of a road surface; and increasing a damping force when a frequency value is increased and increasing the same when a frequency ratio of a road surface is increased.

6. The method of claim 1, further comprising the steps of:

computing a signal corresponding to a vehicle resonant region by passing the road surface signal through a high frequency pass filter as shown in the following Equation (6):

$$\frac{r_{h1}(S)}{r(S)} = \frac{S^2}{S^2 + 2\varepsilon_4 \omega_4 S + \omega_4^2} \quad (6)$$

where, $r_{h1}(S)$ is a passing signal of the high frequency filter and r(S) is a road surface computation value in frequency domain; and computing a representative value corresponding to a high frequency of a road surface by passing the signal representative of vehicle resonance and an absolute value obtained in the following Equation (7) through a low frequency pass filter:

$$\frac{r_h(S)}{|r_{h1}(S)|} = \frac{1}{TS+1} \quad (7)$$

where $r_h(S)$ is a power computation resultant value of a vehicle resonant region.

7. The method of claim 6, further comprising the steps of:

obtaining a ratio by dividing a high frequency representative value and a low frequency representative value of a road surface as shown in the following Equation (8):

$$\omega c(t) = \frac{r_{1(t)}}{r_{h(t)}} \quad (8)$$

and computing a difference of the frequencies of a road surface on which a vehicle runs.

8. The method of claim 6, further comprising the steps of:

forming a two-dimensional map based on two control variables with respect to the high frequency representative value of a road surface and the frequency ratio of a road surface; and increasing a damping force when any one of a frequency value is increased and a frequency ratio of a road surface is increased.

* * * * *

UNITED STATES PATENT AND TRADEMARK OFFICE
CERTIFICATE OF CORRECTION

PATENT NO. : 6,157,879                                                          Page 1 of 1
DATED : December 5, 2000
INVENTOR(S) : Byung-Hack Kwack et al.

It is certified that error appears in the above-identified patent and that said Letters Patent is hereby corrected as shown below:

Column 7, claim 3,
Line 54, change "service" to -- surface --;
Line 56, change "obeyed" to -- obtained --.

Signed and Sealed this

Eighteenth Day of December, 2001

Attest:

JAMES E. ROGAN
Attesting Officer         Director of the United States Patent and Trademark Office